United States Patent
Shin et al.

(10) Patent No.: US 9,384,533 B2
(45) Date of Patent: Jul. 5, 2016

(54) METHOD AND DEVICE FOR CONVERTING IMAGE RESOLUTION, AND ELECTRONIC DEVICE HAVING THE DEVICE

(71) Applicant: SAMSUNG ELECTRONICS CO., LTD., Suwon-si (KR)

(72) Inventors: Ho Seok Shin, Hwaseong-si (KR); Yoon Hak Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 446 days.

(21) Appl. No.: 13/838,343

(22) Filed: Mar. 15, 2013

(65) Prior Publication Data

US 2014/0009469 A1 Jan. 9, 2014

(30) Foreign Application Priority Data

Jul. 9, 2012 (KR) .................... 10-2012-0074294

(51) Int. Cl.
G06T 17/00 (2006.01)
G06T 5/00 (2006.01)
G06T 3/40 (2006.01)

(52) U.S. Cl.
CPC ............ *G06T 5/003* (2013.01); *G06T 3/4053* (2013.01); *G06T 5/006* (2013.01)

(58) Field of Classification Search
None
See application file for complete search history.

(56) References Cited

U.S. PATENT DOCUMENTS

| | | | | |
|---|---|---|---|---|
| 5,757,977 A | * | 5/1998 | Mancuso et al. | 382/260 |
| 6,674,903 B1 | * | 1/2004 | Cliquet | 382/199 |
| 7,978,926 B2 | | 7/2011 | Fairbanks et al. | |
| 8,300,948 B2 | | 10/2012 | Zhang et al. | |
| 8,554,005 B1 | * | 10/2013 | Majewicz | 382/266 |
| 2005/0249417 A1 | * | 11/2005 | Song et al. | 382/199 |
| 2006/0192897 A1 | * | 8/2006 | Morphet | 348/625 |
| 2008/0123998 A1 | * | 5/2008 | Gomi et al. | 382/300 |
| 2008/0226168 A1 | * | 9/2008 | Bae et al. | 382/173 |
| 2009/0033792 A1 | * | 2/2009 | Kano et al. | 348/441 |
| 2009/0226097 A1 | * | 9/2009 | Matsumoto et al. | 382/199 |
| 2009/0238488 A1 | * | 9/2009 | Joon-Ki et al. | 382/264 |
| 2010/0135592 A1 | * | 6/2010 | Zhang et al. | 382/261 |
| 2010/0182459 A1 | * | 7/2010 | Hwang et al. | 348/240.99 |
| 2011/0038558 A1 | * | 2/2011 | Lee et al. | 382/264 |
| 2011/0115934 A1 | | 5/2011 | Wang | |
| 2011/0200270 A1 | * | 8/2011 | Kameyama | 382/260 |
| 2011/0286526 A1 | * | 11/2011 | Nakagami et al. | 375/240.16 |
| 2013/0034313 A1 | * | 2/2013 | Lin et al. | 382/299 |
| 2013/0044965 A1 | * | 2/2013 | Chien et al. | 382/266 |
| 2013/0121568 A1 | * | 5/2013 | Krishnan et al. | 382/162 |
| 2013/0251281 A1 | * | 9/2013 | Bhaskaran | 382/255 |

* cited by examiner

*Primary Examiner* — William Beutel
(74) *Attorney, Agent, or Firm* — Sughrue Mion, PLLC

(57) ABSTRACT

A method for converting an image resolution converts a low resolution image into a high resolution image, generates a second high resolution image by compensating an image quality of the high resolution image, and selectively compensating, by using information about a specific region included in the low resolution image, a region which is included in the second high resolution image and corresponds to the specific region.

2 Claims, 19 Drawing Sheets

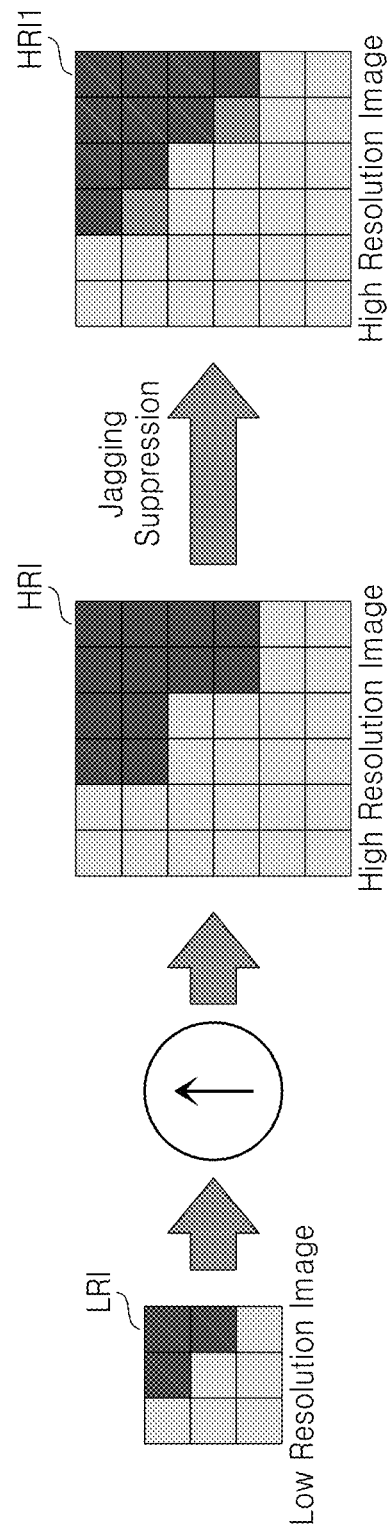

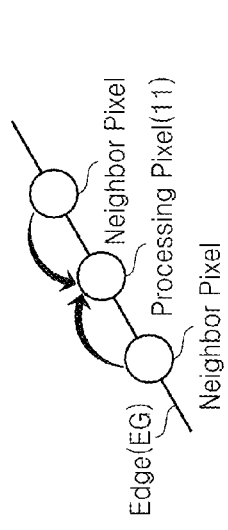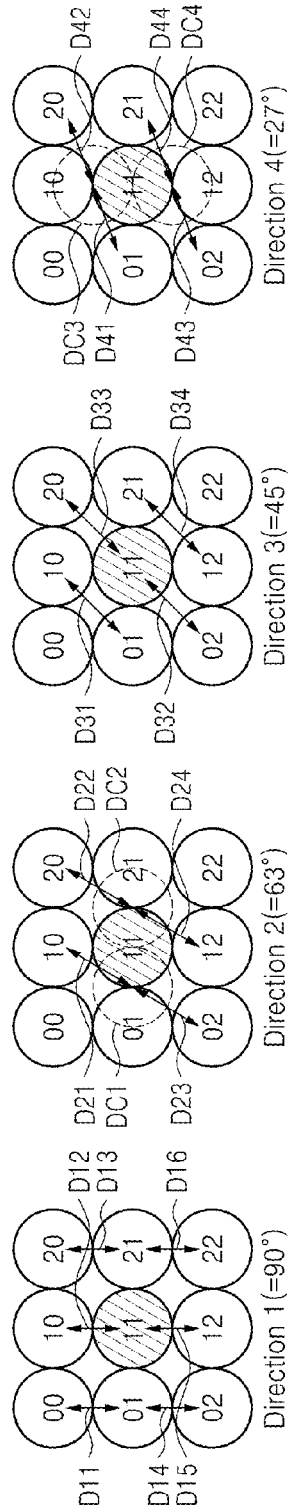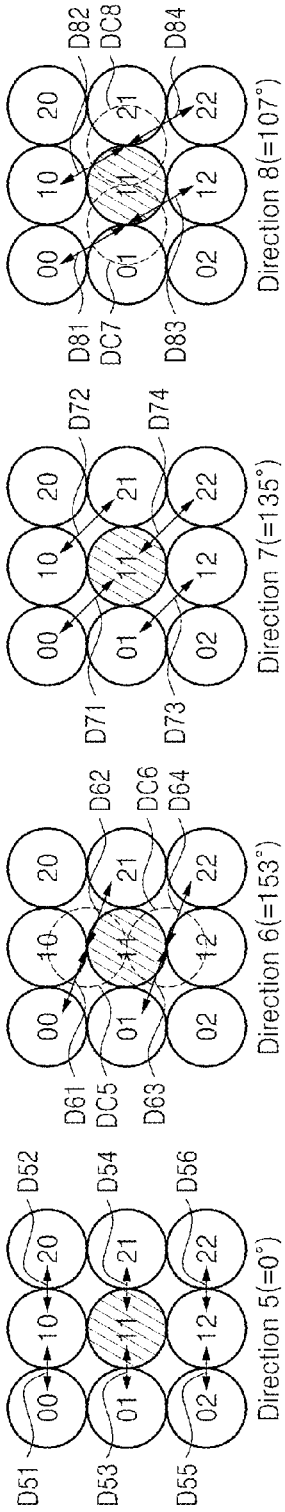

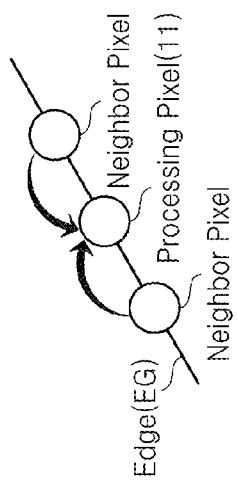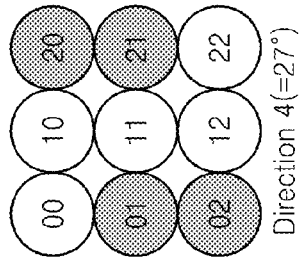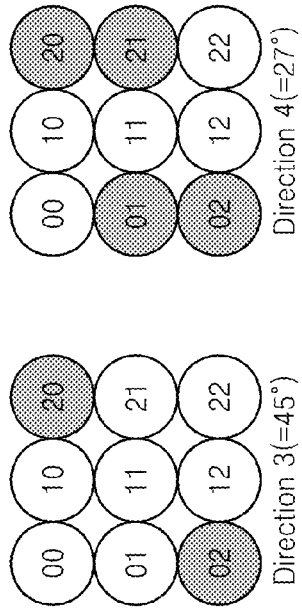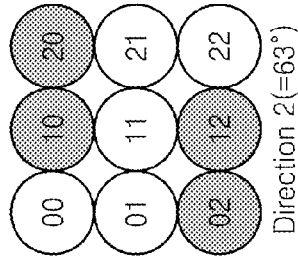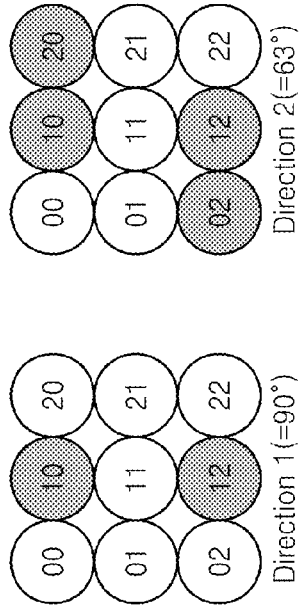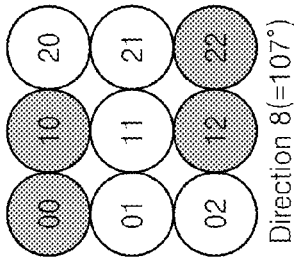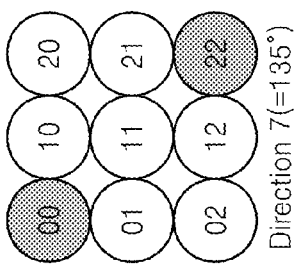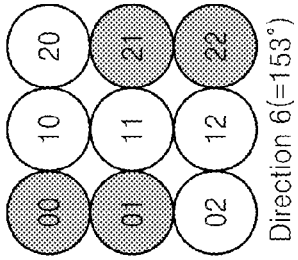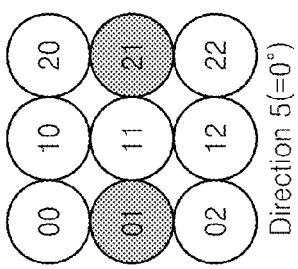

FIG. 9A
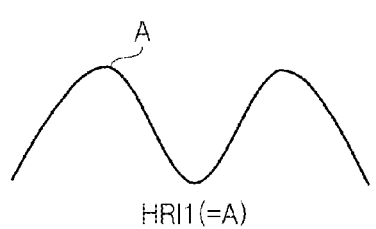
HRI1(=A)
FIG. 9B
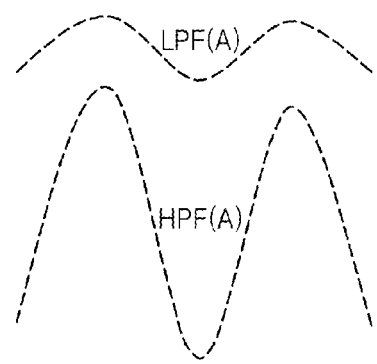
LPF(A)
HPF(A)
FIG. 9D
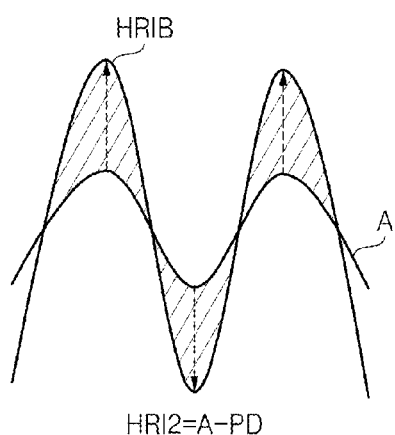
HRIB
A
HRI2=A-PD
FIG. 9C
PD=LPF(A)-HPF(A)

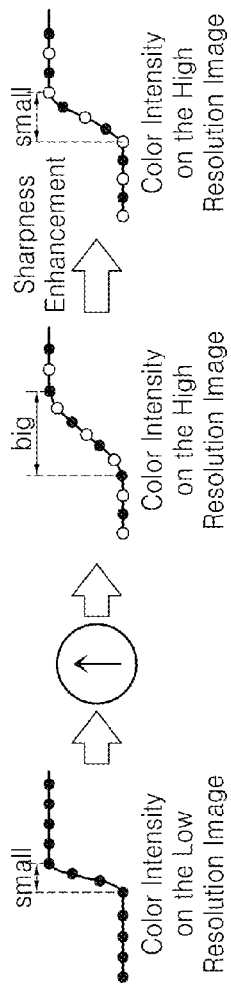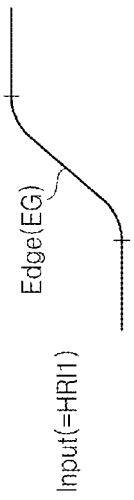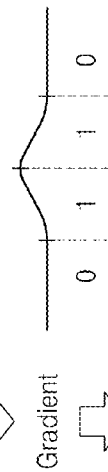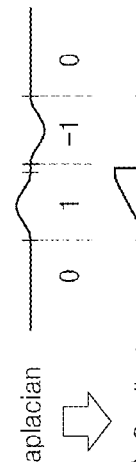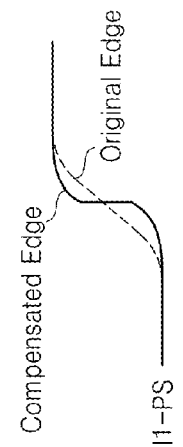
FIG. 10A, FIG. 10B, FIG. 10C SL=((Sign of Gradient)*(Sign of Laplacian))*Gradient, FIG. 10D PS1=SL+Laplacian, FIG. 10E HRI2=HRI1−PS

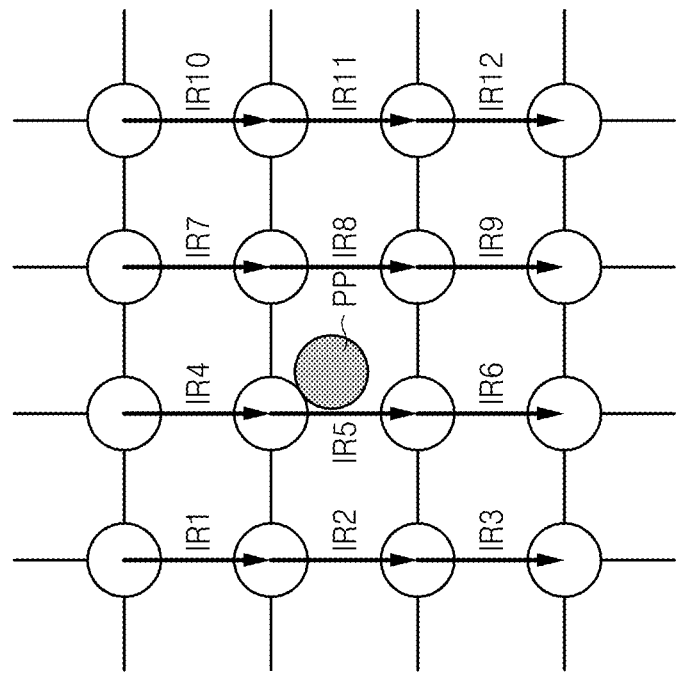
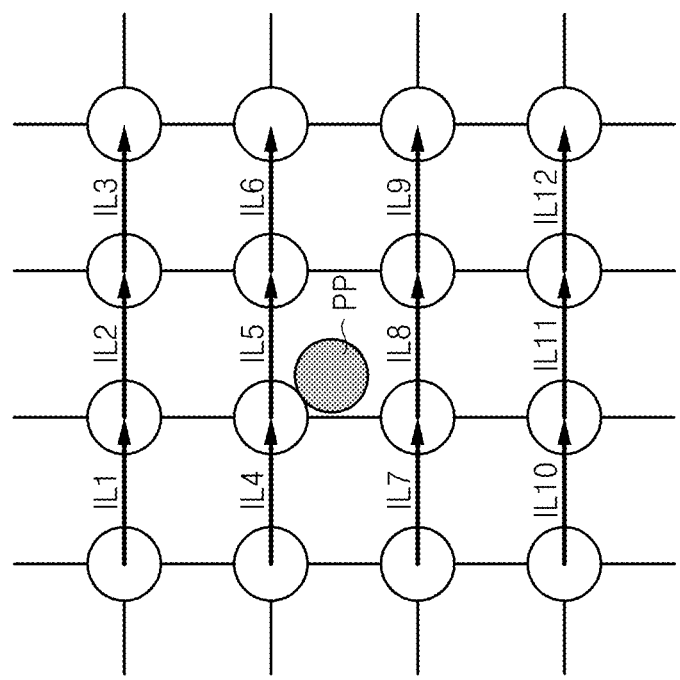
FIG. 13B
FIG. 13A

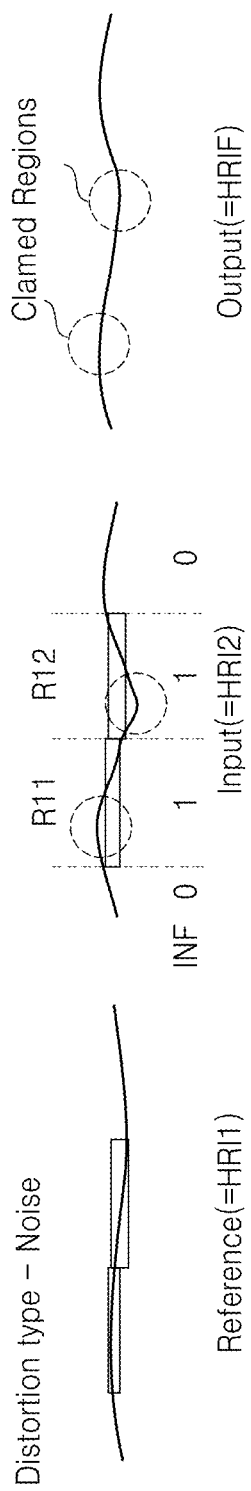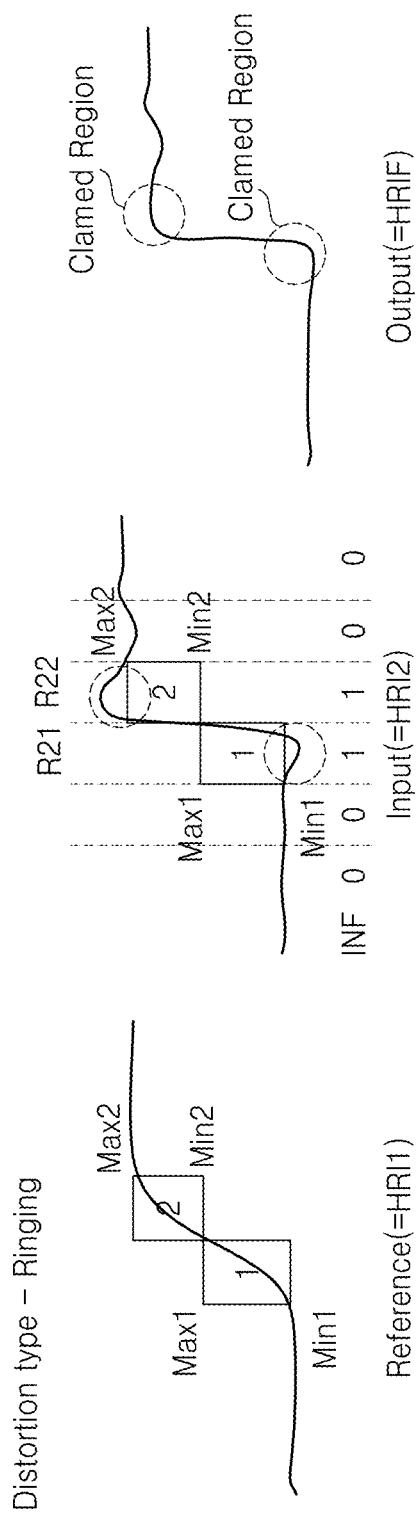
FIG. 15A
FIG. 15B

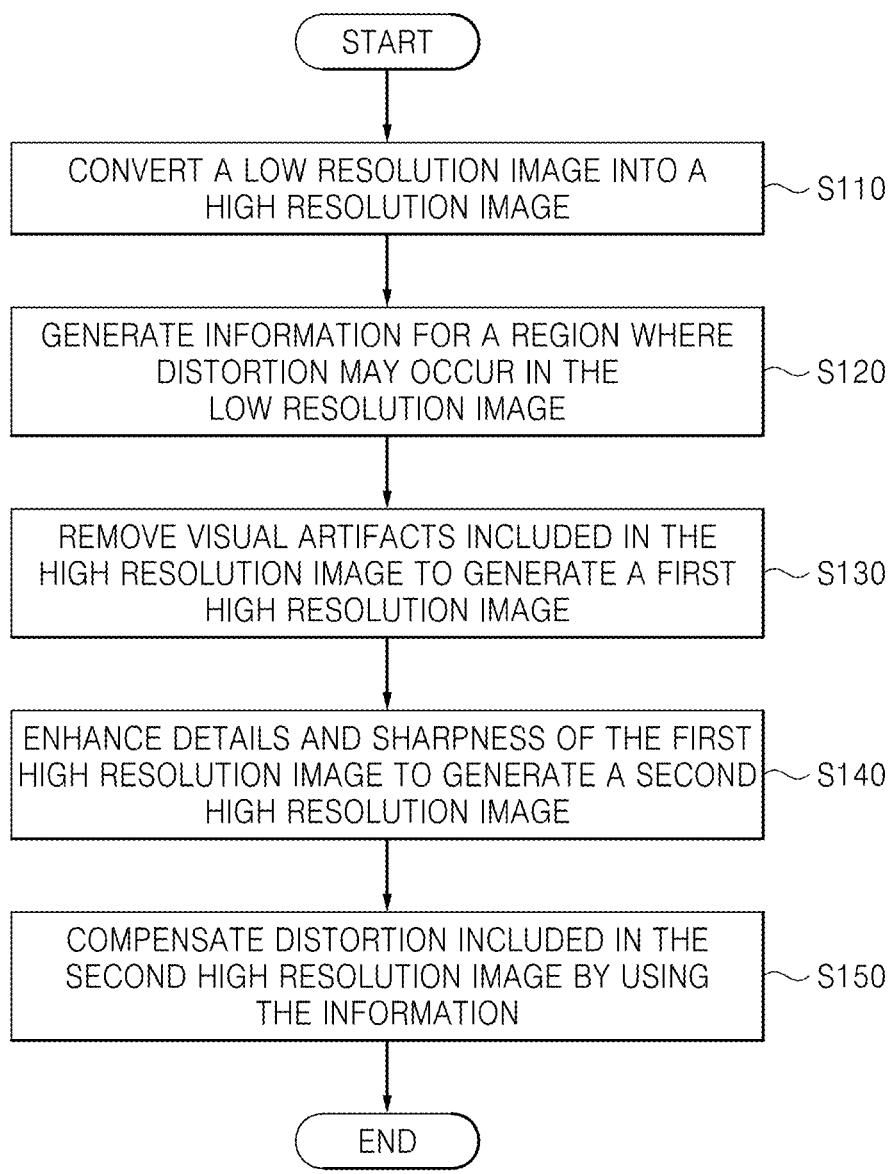

METHOD AND DEVICE FOR CONVERTING IMAGE RESOLUTION, AND ELECTRONIC DEVICE HAVING THE DEVICE

CROSS-REFERENCE TO RELATED APPLICATIONS

This application claims priority under 35 U.S.C. §119(a) from Korean Patent Application No. 10-2012-0074294 filed on Jul. 9, 2012, the disclosure of which is hereby incorporated by reference in its entirety.

BACKGROUND

Exemplary embodiments relate to an image resolution converting technology. More particularly, exemplary embodiments relate to a method and a device for enhancing details and sharpness, as well as efficiently removing visual artifacts included in a high resolution image, converted from a low resolution image.

Recently, a display supporting a full high-definition (FHD) resolution or an ultra high-definition (UHD) resolution has become popular. However, contents of a related art broadcast or film has been made with a standard-definition (SD) resolution or a high-definition (HD) resolution. Since the production cost of a high resolution image is more expensive than a low resolution image, the low resolution image is still produced.

When a user tries to watch a low resolution image through a high resolution television, the low resolution image needs to be expanded (i.e., converted) into a high resolution image. In addition, as a small electronic device, i.e., a smart phone, is developed, the small electronic device provides a function of expanding (i.e., converting) a low resolution image into a high resolution image.

Once a low resolution image is expanded or converted into a high resolution image, various problems may occur. For example, a jagging may occur at an edge of a diagonal line or a ringing may occur around the edge. Further, when a high frequency component is added or enhanced for improved image quality, a noise occurs in a low frequency component region. Additionally, sharpness is deteriorated by slow edge changes, and details of an image are lowered when a high frequency component is eliminated.

SUMMARY

An aspect of an exemplary embodiment is directed to a method for converting an image resolution, including converting a low resolution image into a high resolution image, generating a second high resolution image by compensating an image quality of the high resolution image, and selectively compensating, by using information of a first region included in the low resolution image, a second region which is included in the second high resolution image and corresponds to the first region.

In the converting, the low resolution image may be converted into the high resolution image by using a linear interpolation.

In the generating the second high resolution image, visual artifacts may be removed, which are included in the high resolution image, to generate a first high resolution image, and details and sharpness may be enhanced, of the first high resolution image, to generate the second high resolution image.

In the removing visual artifacts, ringing may be removed, included in the high resolution image, and jagging may be suppressed, included in the ringing removed high resolution image, to generate the first high resolution image are included.

In the removing the ringing, the ringing may be removed by clamping a value of a processing pixel, among pixels included in the high resolution image, to a range between a minimum value and a maximum value of each pixel of the low resolution image adjacent to the processing pixel.

In the suppressing the jagging, a direction of an edge may be detected, included in the ringing removed high resolution image, and the jagging may be suppressed by mixing a value of a processing pixel, among pixels included in the ringing removed high resolution image, in the detected direction with each value of peripheral pixels of the processing pixel, among the pixels.

In the enhancing the details and the sharpness, a high frequency component of a texture may be sampled, included in the first high resolution image, an average gradient compensation value of an edge portion may be calculated, included in the first high resolution image, and the details and the sharpness may be adjusted by using the sampled high frequency component and the average gradient compensation value.

The sampling the high frequency component and the calculating the average gradient compensation value may be executed in parallel. In the sampling the high frequency component, low-pass filtering may occur on the first high resolution image, high-pass filtering may occur on the first high resolution image, and a difference between a low-pass filtered first high resolution image and a high-pass filtered first high resolution image may be calculated, to sample the high frequency component.

In the calculating the average gradient compensation value, a gradient compensation value may be calculated by combining a first derivative value and a second derivative value of the edge for each of a plurality of directions, and the average gradient compensation value may be calculated by averaging the gradient compensation value of each of the plurality of directions.

The adjusting the details and the sharpness may adjust the details and the sharpness by subtracting the sampled high frequency component and the average gradient compensation value from the first high resolution image.

In the selectively compensating the second region, information may be generated indicating if distortion occurs in the first region, and the second region or a clamped second region may be outputted based on the information are included. The distortion may include a noise or ringing.

In the generating the information, each of luminance difference values between pixels may be compared, which are adjacent to a processing pixel of the high resolution image and included in the first region, with a reference luminance value, and a count value may be calculated corresponding to a comparison result, and the information may be generated indicating if the processing pixel is included in the first region according to a result of comparing the count value with a reference count value are included.

The image resolution conversion method may be stored in a recording medium which is written in a computer program and read by a computer.

An aspect of another exemplary embodiments is directed to a device for converting an image resolution, including a resolution conversion circuit which may convert a low resolution image into a high resolution image, an image quality compensation circuit which may generate a second high resolution image by compensating an image quality of the high resolution image, and a compensation circuit which may selectively compensate, by using information of a first region included in the low resolution image, a second region which is included in the second high resolution image and corresponds to the first region.

An aspect of another exemplary embodiment is directed to an electronic device, including a memory and an image resolution conversion device which may process a low resolution image output from the memory.

The image resolution conversion device may include a resolution conversion circuit which converts a low resolution image into a high resolution image, an image quality compensation circuit which generates a second high resolution image by compensating an image quality of the high resolution image, and a compensation circuit which selectively compensates, by using information of a first region included in the low resolution image, a second region which is included in the second high resolution image and corresponds to the first region. The electronic device may be embodied in a TV or a 3D TV. The electronic device may be embodied in a smart phone or a tablet personal computer (PC).

An aspect of another exemplary embodiment is directed to a method of converting an image resolution, including converting a low resolution image into a high resolution image, generating information for a first region where distortion occurs in the low resolution image, and generating a distortion compensated image by using the information of the first region where distortion occurs in the low resolution image.

BRIEF DESCRIPTION OF THE DRAWINGS

FIG. 4 is a conceptual diagram for explaining an operation of a jagging suppression circuit illustrated in FIG. 1;

FIGS. 5A to 5H are conceptual diagrams for explaining an edge direction detection operation of the jagging suppression circuit illustrated in FIG. 1;

FIGS. 6A to 6H are conceptual diagrams for explaining the jagging suppression operation of the jagging suppression circuit illustrated in FIG. 1;

FIGS. 9A to 9D are conceptual diagrams for explaining an operation of the detail enhancement circuit illustrated in FIG. 1;

FIGS. 10A to 10E are conceptual diagrams for explaining an operation of a sharpness enhancement circuit illustrated in FIG. 1;

FIGS. 13A and 13B are conceptual diagrams for explaining an operation of a map generation circuit illustrated in FIG. 1;

FIGS. 15A and 15B are conceptual diagrams for explaining an operation of a distortion compensation circuit illustrated in FIG. 1;

FIG. 19 is a flowchart for explaining an operation of the image resolution conversion device illustrated in FIG. 1.

DETAILED DESCRIPTION OF THE EXEMPLARY EMBODIMENTS

A low resolution image LRI of the exemplary embodiments is an image having a comparatively lower resolution, than a high resolution image HRIF. In addition, compensation for a specific region adjusts each value, e.g., luminance, a RGB value or a YCbCr value, of pixels included in the specific region.

Figure 1:
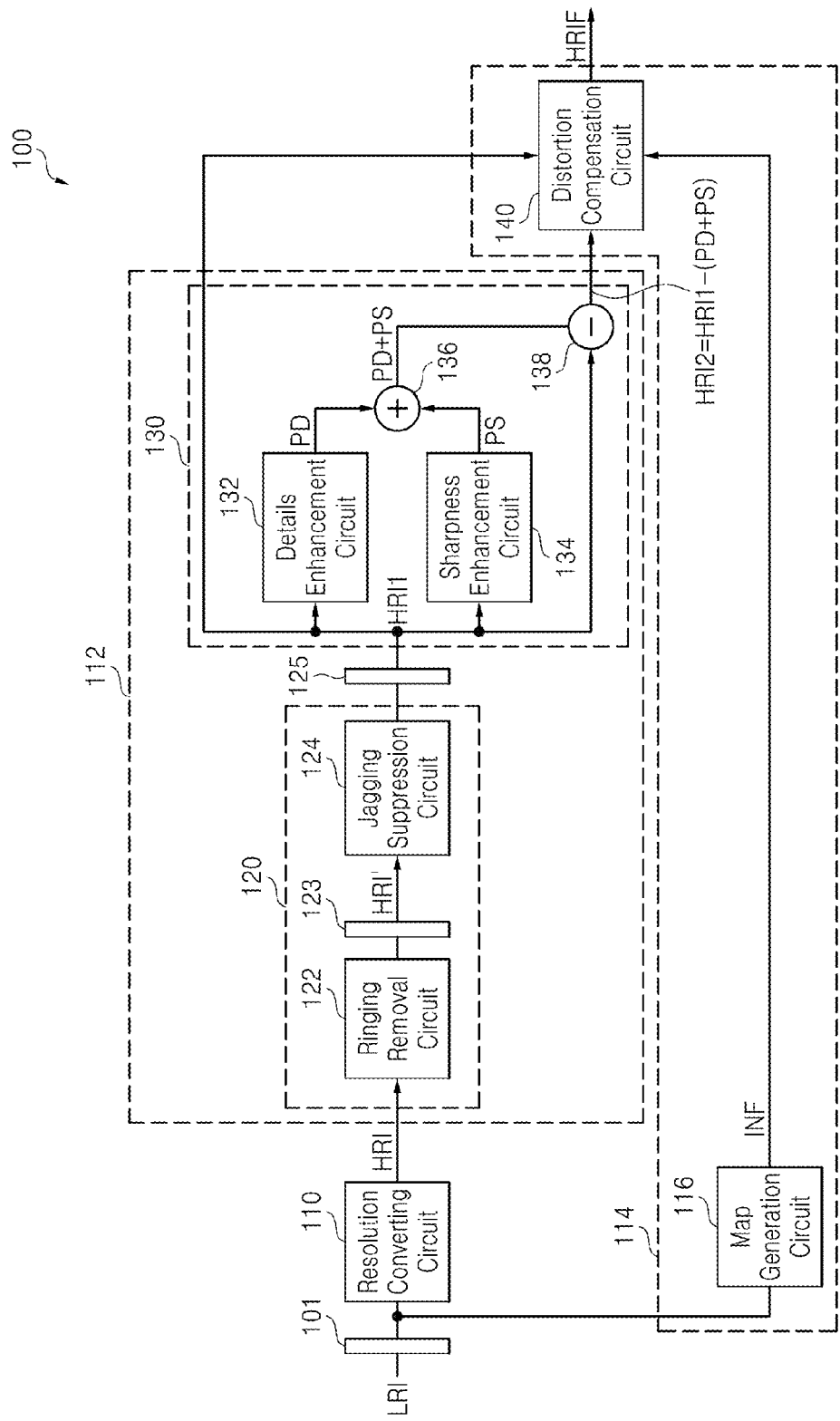
FIG. 1 is a block diagram of an image resolution conversion device according to an example embodiment.

FIG. 1 is a block diagram of an image resolution conversion device according to an example embodiment. Referring to FIG. 1, an image resolution conversion device 100 includes a resolution converting circuit 110, an image quality compensation circuit 112, and a compensation circuit 114.

As an example of an image processing device, the image resolution conversion device 100 may be embodied in a system on chip. The resolution converting circuit 110 may convert a low resolution image LRI into a high resolution image HRI. Accordingly, the resolution converting circuit 110 may perform a function of an up-sampler. A low resolution image LRI may be stored in a first line memory 101.

For example, a low resolution image LRI may be an image in a RGB format, a YUV format, a YCoCg format, or a YCbCr format.

The resolution converting circuit 110 may enlarge a low resolution image LRI, e.g., convert a low resolution image LRI into a high resolution image HRI, by using a linear interpolation, such as a bilinear interpolation or a bicubic interpolation.

For example, according to a bilinear interpolation, a value of a processing pixel, e.g., a pixel of a high resolution image HRI, may be interpolated by using each value of four pixels of a low resolution image LRI, which is the closest to the processing pixel. A value of a processing pixel, e.g., a pixel of a high resolution image HRI, may be interpolated by using each value of 16 pixels of a low resolution image, which is the closest to the processing pixel. Here, 4 or 16 is an exemplarily disclosed number that is used for convenience.

Accordingly, an image quality of a high resolution image, generated based on a bicubic interpolation, may be superior to an image quality of a high resolution image generated, based on a bilinear interpolation.

The image quality compensation circuit 112 includes a visual artifacts removal circuit 120 and an image quality enhancement circuit 130.

The visual artifact removal circuit 120 may generate a first high resolution image HRI1 by removing visual artifacts included in a high resolution image HRI. Here, the visual artifacts may include ringing artifacts (hereinafter, "ringing") and jagging artifacts (hereinafter, "jagging").

The visual artifact removal circuit 120 includes a ringing removal circuit 122 for removing ringing included in a high resolution image HRI, and a jagging suppression circuit 124 for generating a first high resolution image HRI1 by suppressing jagging included in a ringing-removed high resolution image HRI'. The ringing-removed high resolution image HRI' may be stored in a second line memory 123.

Figure 2:
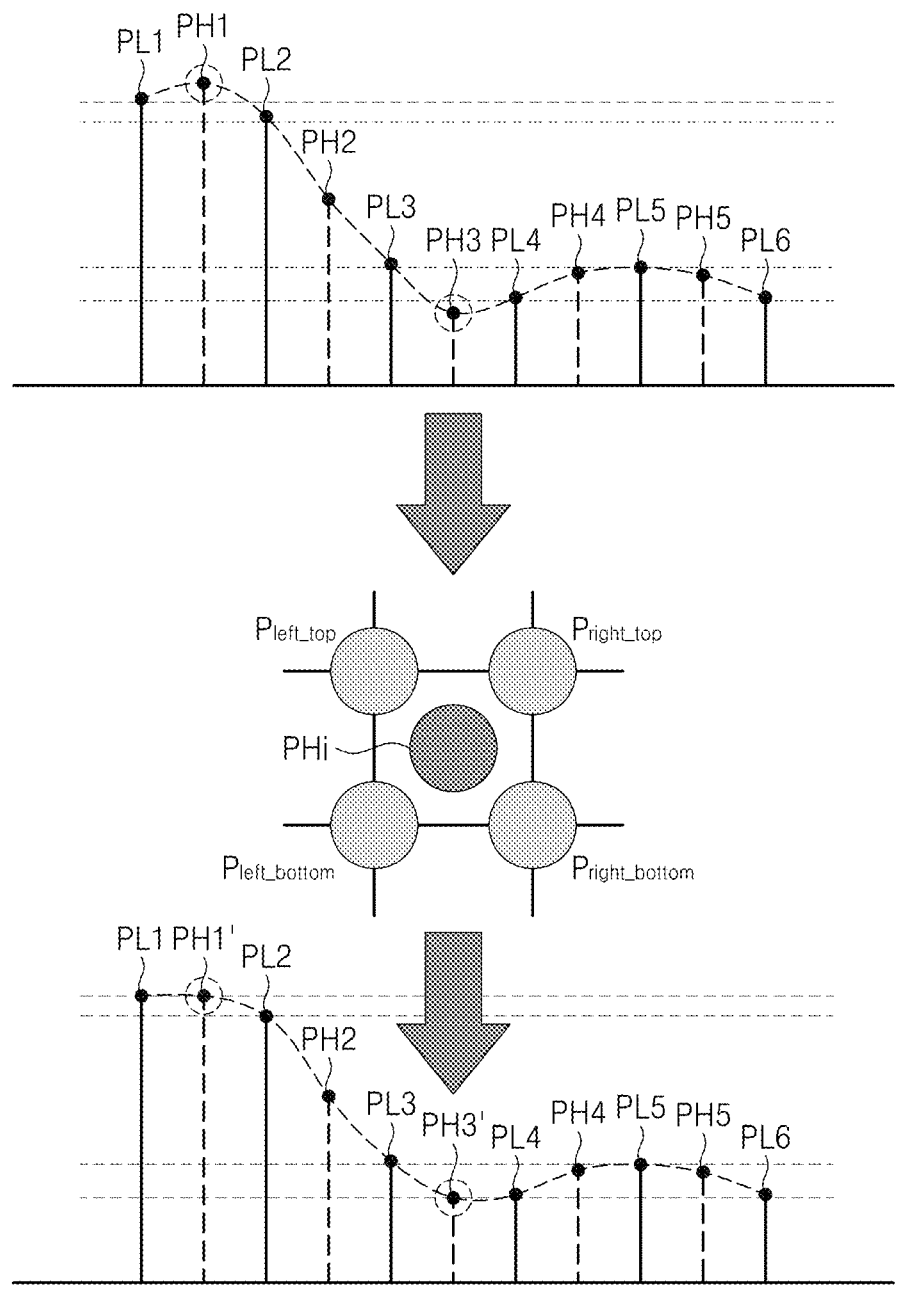
FIG. 2 is a conceptual diagram for explaining an operation of a ringing removal circuit illustrate in FIG. 1.
Figure 3:
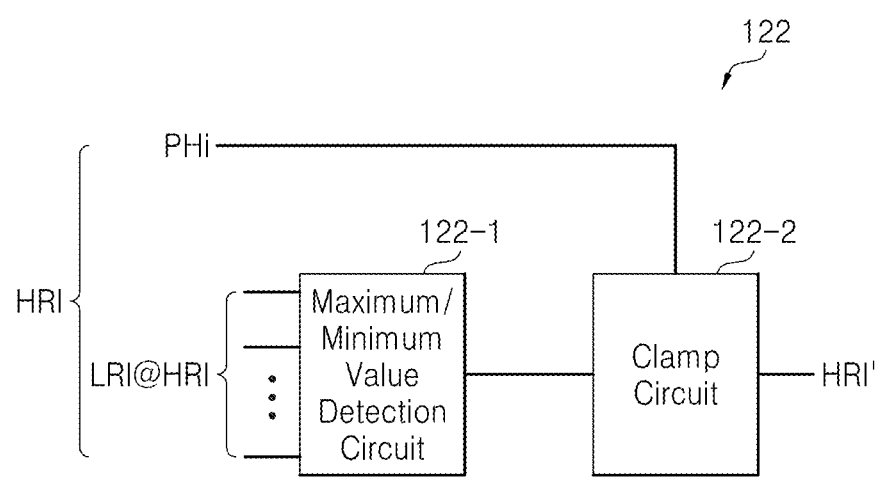
FIG. 3 is a block diagram of the ringing removal circuit illustrated in FIG. 1.

FIG. 2 is a conceptual diagram for explaining an operation of the ringing removal circuit illustrated in FIG. 1. FIG. 3 is a block diagram of the ringing removal circuit illustrated in FIG. 1. When a low resolution image LRI is enlarged or converted into a high resolution image HRI, a weak ringing may occur around an edge inside the high resolution image HRI.

Referring to FIG. 2, when viewed from a one dimensional viewpoint, a value of a processing pixel PH1 of a high resolution image HRI is interpolated by using each value of two pixels PL1 and PL2 of a low resolution image LRI. A value may indicate luminance. However, when viewed from a second dimensional viewpoint, a value of a processing pixel (PHi, i=1) of a high resolution image HRI is interpolated by using each value of four pixels Pleft_top, Pright_top, Pleft_bottom and Pright_bottom, of a low resolution image LRI. Here, ringing may occur by a value of the processing pixel PH1 of the high resolution image HRI.

When viewed from a one dimensional viewpoint, a value of a processing pixel PH1 of a high resolution image HRI is clamped to a range between a maximum value and a minimum value of two pixels PL1 and PL2 of a low resolution image LRI, i.e., a maximum value. Here, PHi' indicates a processing pixel having a clamped value.

For example, a maximum/minimum value detection circuit 122-1 detects a maximum value and a minimum value from a value of each pixel PL1 and PL2, and outputs a detected maximum value and a detected minimum value to a clamp circuit 122-2. The clamp circuit 122-2 clamps a value of a processing pixel PH1 to a range of a maximum value and a minimum value output from the maximum/minimum value detection circuit 122-1, e.g., a maximum value. However, when viewed from a two dimensional viewpoint, a value of the processing pixel PH1 of the high resolution image HRI is clamped according to equation 1 below:

$P\text{min}=\min(P\text{left\_top}, P\text{right\_top}, P\text{left\_bottom}, P\text{right\_bottom})$ $P\text{max}=\max(P\text{left\_top}, P\text{right\_top}, P\text{left\_bottom}, P\text{right\_bottom})$ $PHi=\text{clamp}(PHi, P\text{min}, P\text{max})$ [Equation 1]

The maximum/minimum value detection circuit 122-1 detects a maximum value and a minimum value from a value of each pixel Pleft_top, Pright_top, Pleft_bottom and Pright_bottom, and outputs a detected maximum value and a detected minimum value to the clamp circuit 122-2. The clamp circuit 122-2 clamps a value of a processing pixel PH1 to a range between a maximum value and a minimum value output from the maximum/minimum value detection circuit 122-1.

When viewed from a one dimensional viewpoint, a value of a processing pixel Phi (i=2) of a high resolution image HRI is interpolated by using each value of two pixels PL2 and PL3 of a low resolution image LRI. A value of a processing pixel PH2 ranges between a maximum value and a minimum value of two pixels PL2 and PL3, so the value of the processing pixel PH2 is kept as is.

When viewed from a one dimensional viewpoint, a value of a processing pixel Phi (i=3) of a high resolution image HRI is interpolated by using each value of two pixels PL3 and PL4 of a low resolution image LRI.

However, when viewed from a two dimensional viewpoint, a value of a processing pixel Phi (i=3) of a high resolution image HRI is interpolated by using each value of four pixels Pleft_top, Pright_top, Pleft_bottom, Pright_bottom of a low resolution image LRI. Here, ringing may occur by a value of a processing pixel PH3 of the high resolution image HRI.

When viewed from a one dimensional viewpoint, a value of the processing pixel PH3 of the high resolution image HRI is clamped to a range between a maximum value and a minimum value, i.e., a minimum value, of two pixels PL3 and PL4 of a low resolution image LRI. However, when viewed from a two dimensional viewpoint, a value of the processing pixel PH3 of the high resolution image HRI is clamped according to equation 1.

When viewed from a one-dimensional viewpoint, a value of a processing pixel Phi (i=4) of the high resolution image HRI is interpolated by using each value of two pixels PL4 and PL5 of the low resolution image LRI, and a value of a processing pixel Phi (i=5) of the high resolution image HRI is interpolated by using each value of two pixels PL5 and PL6 of the low resolution image LRI.

As described above, the ringing removal circuit 122 may remove the ringing for at least one processing pixel Phi, which may generate ringing among pixels included in a high resolution image HRI.

FIG. 4 is a conceptual diagram for explaining an operation of the jagging suppression circuit illustrated in FIG. 1. Since a direction of an edge is not considered when a low resolution image LRI is enlarged by two times into a high resolution image HRI, jagging may occur at an edge of a high resolution image HRI. The jagging suppression circuit 124 may generate a first high resolution image HRI1 by suppressing or removing jagging included in the high resolution image HRI.

Referring to FIGS. 1 and 4, the jagging suppression circuit 124 may generate a first high resolution image HRI by suppressing or removing jagging included in a ringing removed high resolution image HRI'.

Figure 7:
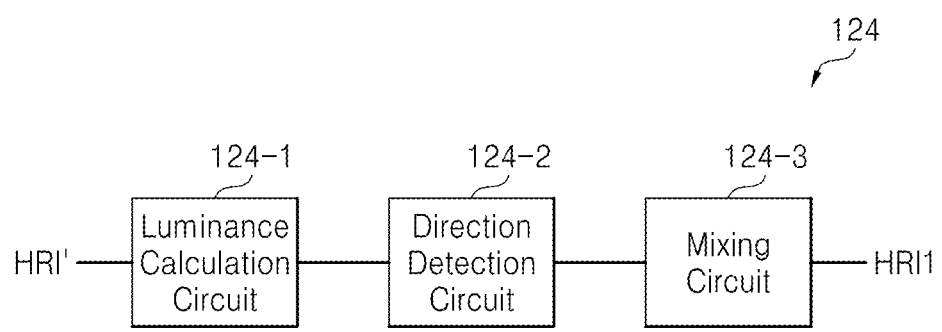
FIG. 7 is a block diagram of the jagging suppression circuit illustrated in FIG. 1.

FIGS. 5A to 5H are conceptual diagrams for explaining an edge direction detection operation of the jagging suppression circuit illustrated in FIG. 1. FIGS. 6A to 6H are conceptual diagrams for explaining a jagging suppression operation of the jagging suppression circuit illustrated in FIG. 1. FIG. 7 is a block diagram of the jagging suppression circuit illustrated in FIG. 1.

Referring to FIGS. 1, 5A to 5H, and 6A to 6H, a direction of an edge exemplarily illustrated may be divided into 9 types, e.g., 0°, 27°, 45°, 63°, 90°, 107°, 135°, 153°, and no existence of an edge. Peripheral pixels 00, 10, 20, 01, 21, 02, 12 and 22 are eight pixels which are the closest to a processing pixel 11.

The jagging suppression circuit 124 calculates luminance of each of nine pixels 00, 10, 20, 01, 11, 21, 02, 12 and 22. The luminance may be calculated in pixels by a luminance calculation circuit 124-1. For example, the luminance may be calculated according to $R*0.299+G*0.587+B*0.111$. Here, R is a value of a red pixel, G is a value of a green pixel, and B is a value of a blue pixel.

In FIG. 5A, each of D11, D12, D13, D14, D15 and D16 indicates an absolute value of a luminance difference between corresponding two pixels 00 and 01, 10 and 11, 20 and 21, 01 and 02, 11 and 12, and 21 and 22. An average value AV1 of luminance differences in a direction 1 (=90°) is SD1/6. Here, SD1 indicates the sum of D11, D12, D13, D14, D15 and D16, and '6' indicates the number of differences.

In FIG. 5B, luminance of each dotted line pixel DC1 and DC2 is an average luminance of each of two pixels 01 and 11, and 11 and 21, where a dotted line is overlapped. For example, luminance of a dotted line pixel DC1 is an average luminance of each of two pixels 01 and 11. In FIG. 5B, each of D21, D22, D23 and D24 indicates an absolute value of a luminance difference between corresponding two pixels 10 and DC1, 20 and DC2, DC1 and 02, and DC2 and 12. Accordingly, an average value AV2 of luminance differences in a direction 2 (=63°) is SD2/4. Here, SD2 indicates the sum of D21, D22, D23 and D24, and '4' indicates the number of differences.

In FIG. 5C, each of D31, D32, D33 and D34 indicates an absolute value of a luminance difference between corresponding two pixels 10 and 01, 02 and 11, 11 and 20, and 12 and 21. Accordingly, an average value AV3 of luminance differences in a direction 3 (=45°) is SD3/4. Here, SD3 indicates the sum of D31, D32, D33 and D34, and '4' indicates the number of differences.

In FIG. 5D, luminance of each dotted line pixel DC3 and DC4 is average luminance of each of two pixels 10 and 11, and 11 and 12, where a dotted line is overlapped. For example, luminance of a dotted line pixel DC3 is an average luminance of each of two pixels 10 and 11. In FIG. 5D, each of D41, D42, D43 and D44 indicates an absolute value of a luminance difference between corresponding two pixels 01 and DC3, DC3 and 20, 02 and DC4, and DC4 and 21. Accordingly, an average value AV4 of luminance differences in a direction 4 (=27°) is SD4/4. Here, SD4 indicates the sum of D41, D42, D43 and D44, and '4' indicates the number of differences.

In FIG. 5E, each of D51, D52, D53, D54, D55 and D56 indicates an absolute value of a luminance difference between corresponding two pixels 00 and 10, 10 and 20, 01 and 11, 11 and 21, 02 and 12, and 12 and 22. Accordingly, an average value AV5 of luminance differences in a direction 5 (=0°) is SD5/6. Here, SD5 indicates the sum of D51, D52, D53, D54, D55 and D56, and '6' indicates the number of differences.

In FIG. 5F, luminance of each dotted line pixel DC5 and DC6 is an average luminance of each of two pixels 10 and 11, and 11 and 12, where a dotted line is overlapped. In FIG. 5F, each of D61, D62, D63 and D64 indicates an absolute value of a luminance difference between corresponding two pixels 00 and DC5, DC5 and 21, 01 and DC6, and DC6 and 22. Accordingly, an average value AV6 of luminance differences in a direction 6 (=153°) is SD6/4. Here, SD6 indicates the sum of D61, D62, D63 and D64, and '4' indicates the number of differences.

In FIG. 5G, each of D71, D72, D73 and D74 indicates an absolute value of a lamination difference between corresponding two pixels 00 and 11, 10 and 21, 01 and 12 and 11 and 22. Accordingly, an average value AV7 of luminance differences in a direction 7 (=45°) is SD7/4. Here, SD7 indicates the sum of D71, D72, D73 and D74, and '4' indicates the number of differences.

In FIG. 5H, luminance of each dotted line pixel DC7 and DC8 is an average luminance of each of two pixels 01 and 11, and 11 and 21, where a dotted line is overlapped. In FIG. 5H, each of D81, D82, D83 and D84 indicates an absolute value of a luminance difference between corresponding two pixels 00 and DC7, 10 and DC8, DC7 and 12, and DC8 and 22. Accordingly, an average value AV8 of luminance differences in a direction 8 (=107°) is SD8/4. Here, SD8 indicates the sum of D81, D82, D83 and D84, and '4' indicates the number of differences.

The jagging suppression circuit 124 calculates an average value AV1 through AV8 of luminance differences in each direction, and detects or selects a direction having the smallest value among the average values AV1 through AV8 as a direction of an edge EG.

The direction detection circuit 124-2, as explained referring to FIG. 5A through FIG. 5H, may calculate a luminance difference between corresponding two pixels in each direction, calculate an average value of a luminance difference in each direction based on calculated luminance differences, detect a direction of an edge EG based on calculated average values of luminance differences, and output each value of pixels included in a detected direction to a mixing circuit 124-3. However, when a difference between a maximum value and a minimum value among the average values AV1 to AV8 is smaller than a reference value, the jagging suppression circuit 124, e.g., the direction detection circuit 124-2, determines that there are no edges around the processing pixel 11.

As illustrated in FIGS. 6A to 6H, peripheral pixels selected, to remove jagging occurring at an edge EG of a ringing removed high resolution image HRI', are different from each other according to an edge direction. For example, when a direction 1 is detected as a direction of an edge EG, pixels 10 and 12 may be selected as peripheral pixels of the processing pixel 11 as illustrated in FIG. 6A, by the jagging suppression circuit 124, e.g., the direction detection circuit 124-2, and each value of selected pixels 10, 11 and 12 may be output to the mixing circuit 124-3.

As another example, when a direction 4 is detected as a direction of the edge EG, pixels 01, 02, 20 and 21 may be selected as peripheral pixels of the processing pixel 11 as illustrated in FIG. 6D, by the jagging suppression circuit 124, e.g., the direction detection circuit 124-2, and each value of selected pixels 01, 02, 11, 20 and 21 may be output.

As still another example, when a direction 7 is detected as a direction of the edge EG, pixels 00 and 22 may be selected as peripheral pixels of the processing pixel 11, by the jagging suppression circuit 124, e.g., the direction detection circuit 124-2, as illustrated in FIG. 6G, and each value of selected pixels 00, 11 and 22 may be output to the mixing circuit 124-3.

The direction detection circuit 124-2 transmits a value of each pixel required by the mixing circuit 124-3 to the mixing circuit 124-3. The jagging suppression circuit 124, e.g., the mixing circuit 124-3, calculates a mixed value Pj of the processing pixel 11 according to equation 2 below. A value may mean a RGB value.

$$P_j = (1-\alpha) \times I + \alpha \times \frac{\sum_{n=1}^{n \leq \# \ neighbor} D_n I}{n} \quad \text{[Equation 2]}$$

Here, α indicates a variable for adjusting a mixture ratio, I indicates a value of the processing pixel 11, n indicates the number of pixels to be mixed, and DnI indicates each value of pixels to be mixed.

Each of a neighbor number and n, where n is a natural number, indicates the number of pixels to be mixed. As illustrated in FIGS. 6A to 6H, a neighbor number and n of a Direction 1, a Direction 3, a Direction 5, or a Direction 7 are respectively 2, and a neighbor number and n of a Direction 2, a Direction 4, a Direction 6 or a Direction 8 are respectively 4. Accordingly, when a Direction 1 is detected as a direction of an edge EG, the mixing circuit 124-3 determines a mixed value Pj of the processing pixel 11 according to a value I of the processing pixel 11 and an average value. The average value is an average value for each value of two pixels 10 and 12.

As another example, when a Direction 2 is detected as a direction of the edge EG, the mixing circuit 124-3 determines a mixed value Pj of the processing pixel 11 according to a value I of the processing pixel 1 and an average value. The average value is an average value of each value of four pixels 10, 20, 02 and 12.

As described above, the visual artifact removal circuit 120 removes ringing and jagging included in a high resolution image HRI successively, and generates a ringing and jagging removed first resolution image HRI1.

The image quality enhancement circuit 130 may generate a second high resolution image HRI2 by enhancing details and sharpness of the first high resolution image HRI1. The image quality enhancement circuit 130 includes a detail enhancement circuit 132, a sharpness enhancement circuit 134 and an adjusting circuit.

Figure 8:
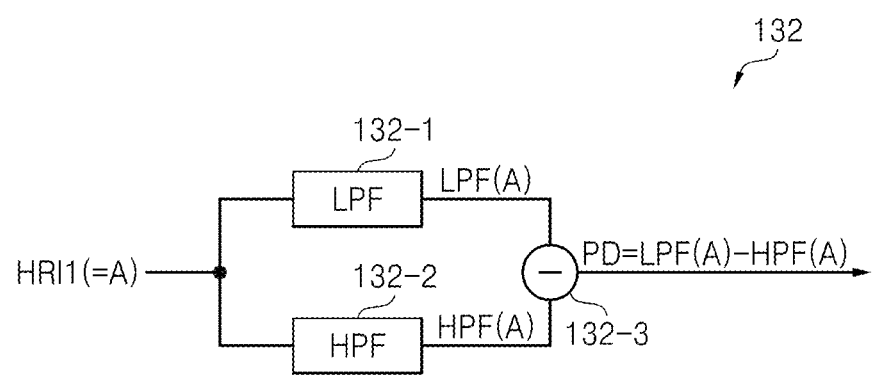
FIG. 8 is a block diagram of a detail enhancement circuit illustrated in FIG. 1.

FIG. 8 is a block diagram of the detail enhancement circuit illustrated in FIG. 1. FIGS. 9A to 9D are conceptual diagrams for explaining an operation of the detail enhancement circuit illustrated in FIG. 1. When a low resolution image LRI is enlarged to a high resolution image HRI through a linear interpolation, a high frequency component is removed or weakened, so that a blurred high resolution image HRI may be generated. Accordingly, a high frequency component of a high resolution image HRI should be added or amplified in order to enhance a detail or a texture of the blurred high resolution image HRI.

The detail enhancement circuit 132 samples (or extracts) a weakened high frequency component from the first high resolution image HRI1, and outputs a sampled high frequency component PD to an adder 136. The first high resolution image HRI1 may be stored in a third line memory 125.

Referring to FIGS. 1, 8, and 9A to 9D, when a waveform of an input signal input to the detail enhancement circuit 132 is FIG. 9A, the detail enhancement circuit 132 low-pass filters a first high resolution image HRI1=A by using a low pass filter 132-1 and generates a low pass filtered first high resolution image LPF(A) (FIG. 9B).

In addition, the detail enhancement circuit 132 high-pass filters the first high resolution image HRI1=A by using a high pass filter 132-2 and generates a high pass filtered first high resolution image HPF(A) (FIG. 9B). Low pass filtering and high pass filtering may be performed at the same time. The detail enhancement circuit 132 removes a high frequency component included in the first high resolution image HRI1=A by using the low pass filter 132-1, and emphasizes or amplifies a high frequency component included in the first high resolution image HRI1=A by using the high pass filter 132-2.

A subtracter 132-3 of the detail enhancement circuit 132 calculates a difference between the low pass filtered first high resolution image LPF(A) and the high pass filtered first high resolution image HPF(A) (FIG. 9C). In other words, the detail enhancement circuit 132 compares a high frequency-removed first high resolution image (LPF(A) or signals) with a high frequency-emphasized or amplified first high resolution image (HPF(A) or signals), and samples a high frequency component, e.g., an amplified high frequency component.

As illustrated in FIG. 9D, the subtracter 138 of FIG. 1 may amplify a high frequency component of the first high resolution image HRI1=A by subtracting a high frequency component PD sampled from the first high resolution image HRI1=A, i.e., adding the sampled high frequency component PD to the first high resolution image HRI1=A. Accordingly, the image quality enhancement circuit 130 may amplify detail of the first high resolution image HRI1=A, i.e., a high frequency component of a texture through FIG. 9A to FIG. 9D.

Figure 11:
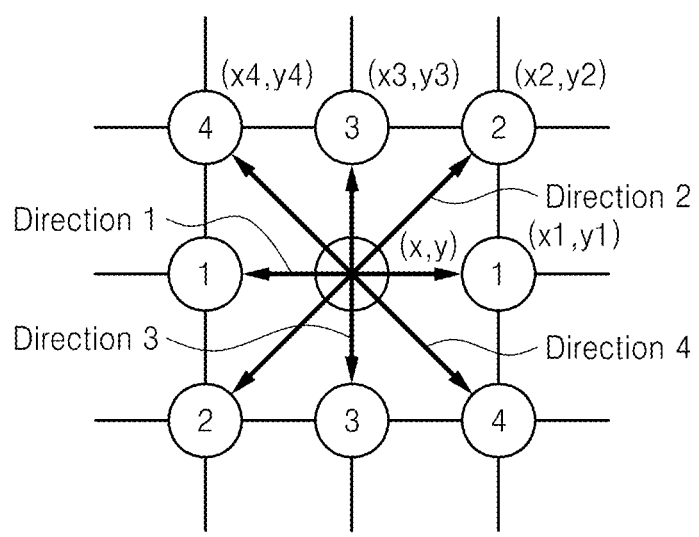
FIG. 11 is a conceptual diagram for explaining a method of calculating an average gradient compensation value of the sharpness enhancement circuit illustrated in FIG. 1.
Figure 12:
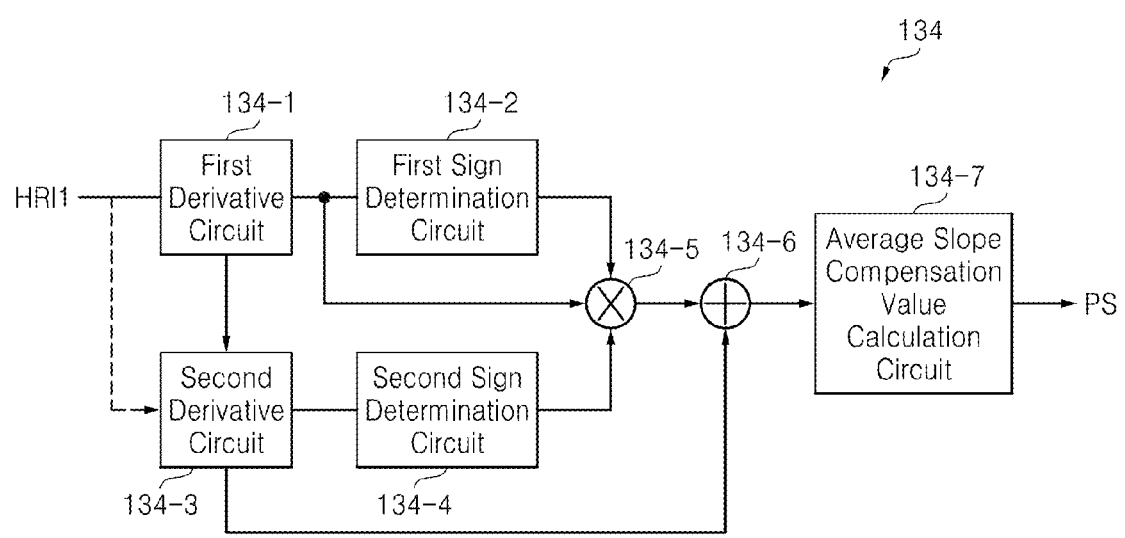
FIG. 12 is a block diagram of the sharpness enhancement circuit illustrated in FIG. 1.

FIGS. 10A to 10E are conceptual diagrams for explaining an operation of the sharpness enhancement circuit illustrated in FIG. 1. FIG. 11 is a conceptual diagram for explaining a method for calculating an average gradient compensation value of the sharpness enhancement circuit illustrated in FIG. 1. FIG. 12 is a block diagram of the sharpness enhancement circuit illustrated in FIG. 1.

The sharpness enhancement circuit 134 of FIG. 1 calculates a gradient compensation value PSk, where k is a natural number, by combining a first derivative value and a second derivative value for an edge EG in each of a plurality of directions, and calculates an average gradient compensation value PS by averaging a gradient compensation value PSk for each of the plurality of directions. The sharpness enhancement circuit 134 of the exemplary embodiments does not use an iteration method for enhancement of sharpness.

For one direction, the sharpness enhancement circuit 134 first differentiates an edge EG included in the first resolution image HRI1 (FIG. 10A and a first derivative (differential) circuit 134-1 of FIG. 12), and differentiates a first differentiated edge a second time (FIG. 10B and a second derivative (differential) circuit 134-3 of FIG. 12). According to an example embodiment, the second derivative circuit 134-3 of FIG. 12 may differentiate the edge (or edge portion) EG included in the first high resolution image HRI1 a second time.

Additionally, the sharpness enhancement circuit 134 calculates a gradient compensation value PS1 of the edge part EG by combining a first derivative value and a second derivative value (FIG. 10D and an adder 134-6 of FIG. 12).

In each section, the sharpness enhancement circuit 134 may determine a sign by multiplying a sign of a first derivative value and a sign of a second derivative value, and calculate an intermediate value SL by multiplying a first derivative value by a determined sign (FIG. 10C). For example, a first sign determination circuit 134-2 determines a sign of an output signal Gradient of a first derivative circuit 134-1. A second sign determination circuit 134-4 determines a sign of an output signal Laplacian of the second derivative circuit 134-3.

A multiplier 134-5 receives and multiplies a sign determined by the first sign determination circuit 134-2, a sign determined by the second sign determination circuit 134-4, and an output signal Gradient of the first derivative circuit 134-1 (FIG. 10C).

The sharpness enhancement circuit 134 calculates a gradient compensation value PS1 for one direction by adding an intermediate value SL and the second derivative value. For example, the adder 134-6 adds an output signal SL of the multiplier 134-5 and an output signal Laplacian of the second derivative circuit 134-3 (FIG. 10D), and outputs a gradient compensation value PS1 for one direction according to an addition result.

The process of calculating a gradient compensation value of an edge for each direction is illustrated in detail, referring to FIG. 10A to FIG. 10E.

The process of calculating a gradient compensation value PSk (k=1, 2, 3 and 4) of an edge for each of four directions is explained in detail, referring to FIGS. 10A to 10E and 11. An average gradient compensation value PS for each of the four directions is calculated according to equation 3 below.

[Equation 3]
$$PS = \frac{1}{n}\sum_{n=1}^{n=4} Wn \times PSn$$

$$Wn = \frac{1}{\sqrt{(x_n - x)^{2+}(y_n - y)^2}}$$

In other words, $$PS = \left(PS1 + \frac{1}{\sqrt{2}}PS2 + PS3 + \frac{1}{\sqrt{2}}PS4\right)/4$$

Each of PS1, PS2, PS3 and PS4 indicates a gradient compensation value for each of a Direction 1, a Direction 2, a Direction 3 and a Direction 4. In addition, a center pixel, having coordinates of (x,y), is a pixel included in an edge, and $(x_k, y_k)$ are coordinates of each of the peripheral pixels, where k is 1, 2, 3 and 4.

For example, the average gradient compensation value calculation circuit 134-7 may calculate an average gradient compensation value PS for each of the four directions according to equation 3. The average gradient compensation value calculation circuit 134-7 may calculate an average gradient compensation value PS for more than 5 directions, according to equation 3.

As illustrated in FIG. 10E, the subtracter 138 of FIG. 1 compensates a gradient of an original edge by subtracting an average gradient compensation value PS from a first high resolution image HRI1=A, and calculates a compensated edge.

Referring to FIG. 1, the adder 136 of the image quality enhancement circuit 130 adds a high frequency component PD, sampled by the detail enhancement circuit 132, and an average gradient compensation value PS, calculated by the sharpness enhancement circuit 134. The subtracter 138 of the image quality enhancement circuit 130 subtracts a sampled high frequency component PD and an average gradient compensation value PS from the first high resolution image HRI1, and outputs a second high resolution image (HRI2=HRI1−(PD+PS)), whose details and sharpness are enhanced as a result of the subtraction.

According to the first high resolution image HRI1, the sampled high frequency component PD and/or the average gradient compensation value PS may not exist. The adder 136 and the subtracter 138 perform a function of an adjusting circuit for adjusting details and/or sharpness of the first high resolution image HRI1.

The compensation circuit 114 may selectively compensate each of second regions included in a second high resolution image HRI2 by using information INF for each of first regions included in a low resolution image LRI. Each of the second regions corresponds to each of the first regions.

The compensation circuit 114 includes a map generation circuit 112 and a distortion compensation circuit 140.

The map generation circuit 112 may generate a map, including information INF indicating if distortion may occur in each of the first regions. The distortion compensation circuit 140 may output a specific region of a second high resolution image HRI2 as it is, or output clamped or compensated specific region based on the information INF.

Figure 14:
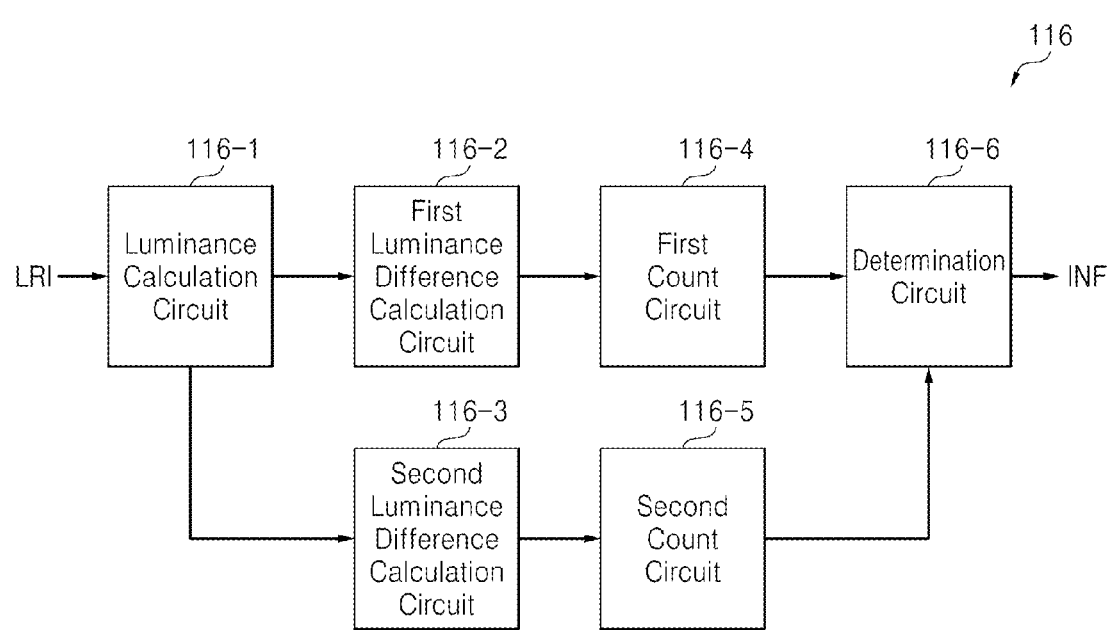
FIG. 14 is a circuit diagram of the map generation circuit illustrated in FIG. 1.

FIGS. 13A and 13B are conceptual diagrams for explaining an operation of the map generation circuit illustrated in FIG. 1. FIG. 14 is a circuit diagram of the map generation circuit illustrated in FIG. 1. Referring to FIG. 1, the map generation circuit 112 may generate a map, including information INF for each of regions where distortion may occur in a low resolution image LRI.

When details and sharpness of the first high resolution image HRI1 are enhanced, a high frequency component may be excessively emphasized or amplified in some regions of the first high resolution image HRI1, and distortion, e.g., noise and ringing, may occur. The noise occurs in a flat region where a change of value is small. The ringing occurs at an edge where a change of value is large. A value may be a RGB value.

The map generation circuit 112 may generate information INF, for a region where distortion may be more likely to occur, to remove distortion, e.g., noise and ringing, from the distortion compensation circuit 140. It is more efficient and has less computational complexity to find each of the regions where noise and ringing may occur from a low resolution image than from a high resolution image.

In a case of a flat region, where a noise may possibly occur or an edge region where ringing possibly occurs, each value of peripheral pixels included in the region changes less.

Referring to FIGS. 13A and 13B, in order to determine if distortion may occur in a processing pixel PP of a specific region included in a high resolution image, 16 low resolution pixels adjacent to the processing pixel PP are used. The 16 low resolution pixels are included in a specific region of a low resolution image, corresponding to the specific region.

The map generation circuit 112 may calculate luminance of each of the 16 low resolution pixels. The luminance may be calculated in pixels by a luminance calculation circuit 116-1. Calculated luminance may be transmitted to each luminance difference calculation circuit 116-2 and 116-3.

As illustrated in FIG. 13A, the map generation circuit 112 may calculate luminance difference values IL1 through IL12 between corresponding two pixels, which are neighboring in a horizontal direction. For example, luminance difference values IL1 through IL12 may be calculated by a first luminance difference calculation circuit 116-2. In addition, as illustrated in FIG. 13B, the map generation circuit 112 may calculate luminance difference values IR1 through IR12 between corresponding two pixels, which are neighboring in a vertical direction. For example, luminance difference values IR1 through IR12 may be calculated by a second luminance difference calculation circuit 116-3.

The map generation circuit 112 may compare each of luminance difference values IL1 through IL12 and IR1 through IR12 with a reference luminance value, and calculate a count value corresponding to a comparison result.

For example, the map generation circuit 112 may calculate a count value by counting the number of luminance difference values having a smaller value than the reference luminance value, among the luminance difference values IL1 through IL12 and IR1 through IR12.

For example, a first count circuit 116-4 may compare a reference luminance value with each of luminance difference values IL1 through IL12 output from the first luminance difference calculation circuit 116-2, and calculate a first count value corresponding to a comparison result. For example, the first count circuit 116-4 may calculate a first count value by counting the number of luminance difference values having a smaller value than the reference luminance value, among the luminance difference values IL1 through IL12.

For example, the second count circuit 116-5 may compare the reference luminance value with each of luminance difference values IR1 through IR12 output from the second luminance difference calculation circuit 116-3, and calculate a second count value corresponding to a comparison result. For example, the second count circuit 116-5 may calculate a second count value by counting the number of luminance difference values having a smaller value than a reference luminance value, among the luminance difference values IR1 through IR12.

In addition, when the sum of the first count value and the second count value is greater than a reference count value, the map generation circuit 112 may determine that a processing pixel PP exists in a flat region, where a noise may occur or in an edge region where ringing may occur. For example, a determination circuit 116-6 may determine that a processing pixel PP exists in a flat region, where a noise may occur or in an edge region where ringing may occur.

Accordingly, the map generation circuit 112, e.g., the determination circuit 116-6, may generate information INF indicating distortion may occur in a region, including a processing pixel PP, i.e., a region of a high resolution image. For example, the information INF may be set to a data '1'. However, when the count value is smaller than or equal to a reference count value, the map generation circuit 112, e.g., the determination circuit 116-6, may generate information INF indicating distortion may not occur in a region, including the processing pixel PP. For example, the information may be set to a data '0'.

The map generation circuit 112 may generate a map, including information INF for each of all regions included in a low resolution image LRI. The information INF included in the map may be successively transmitted to a distortion compensation circuit 140. According to an example embodiment, the information INF may be stored in an additional memory.

Figure 16:
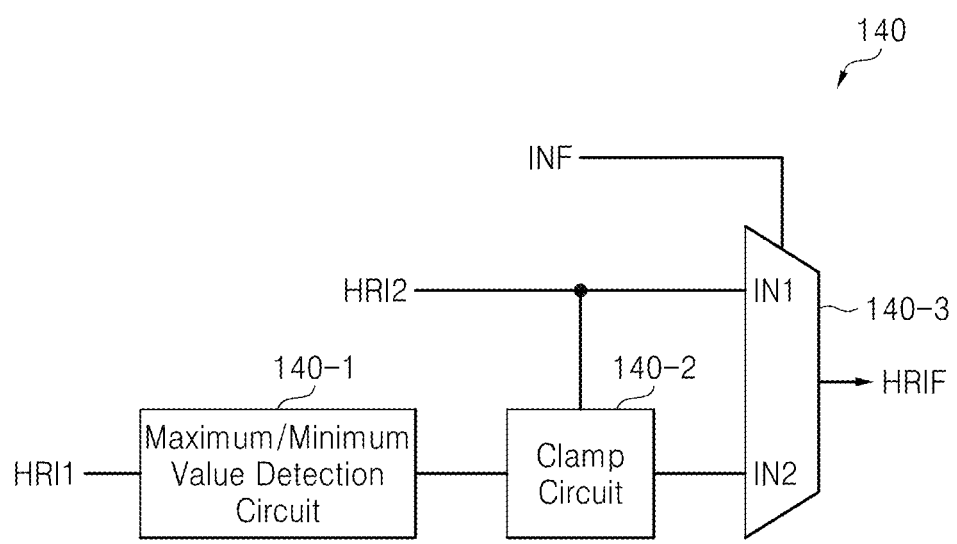
FIG. 16 is a circuit diagram of the distortion compensation circuit illustrated in FIG. 1.

FIGS. 15A and 15B are conceptual diagrams for explaining an operation of the distortion compensation circuit illustrated in FIG. 1. FIG. 16 is a circuit diagram of the distortion compensation circuit illustrated in FIG. 1.

For convenience, each region included in a low resolution image LRI is simply defined as 'a first region', each region included in a second high resolution image HRI2 including a noise and/or ringing is defined as 'a second region', and each region included in a first high resolution image HRI1 which does not include a noise and/or ringing is defined as 'a third region'.

In addition, each of the second region and the third region is assumed to correspond to the first region, respectively, and the second region and the third region are assumed to correspond to each other. Additionally, a third region of the first high resolution image HRI1 and a second region of the second high resolution image HRI2, which are synchronized on a time basis, are assumed to be supplied to the distortion compensation circuit 140 at the same time.

When the information INF is a data '0', the distortion compensation circuit 140 outputs a second region as is. However, when the information INF is a data '1', the distortion compensation circuit 140 clamps or compensates a second region, referring to a third region, and outputs the clamped or compensated second region.

As illustrated in FIG. 15A, when a distortion type is a noise, the distortion compensation circuit 140 removes or compensates distortion only for each region R11 and R12, which corresponds to a data '1' (INF=1), i.e., where distortion may occur.

For example, a region R11 of the second high resolution image HRI2 is clamped to one of a minimum value and a maximum value of the first high resolution image HRI1, e.g., a maximum value, by a clamp circuit 140-2. In other words, a value of a processing pixel included in a region R11 of the second high resolution image HRI2 is clamped to a maximum value of a pixel of a first high resolution region, corresponding to the region R11.

In addition, a region R12 of the second high resolution image HRI2 is clamped to one of a minimum value and a maximum value of the first high resolution image HRI1, e.g., a minimum value, by the clamp circuit 140-2. In other words, a value of a processing pixel included in a region R12 of the second high resolution image HRI2 is clamped to a minimum value of a pixel of a first high resolution region, corresponding to the region R12.

A maximum/minimum value detection circuit 140-1 may detect a maximum value and a minimum value by regions of the first high resolution image HRI1, and may transmit a detected maximum value and a detected minimum value to the clamp circuit 140-2.

The clamp circuit 140-2 may clamp by regions of a second high resolution image HRI2, within a range of the maximum value and a minimum value, which are detected by the maximum/minimum value detection circuit 140-1. For example, when the information INF is a data '1', the distortion compensation circuit 140, e.g., the clamp circuit 140-2, clamps each region R11 and R12 of the second high resolution image HRI2 by referring to each region of the first high resolution image HRI1 corresponding to each region R11 and R12 of the second high resolution image HRI2, and outputs a clamped region.

As illustrated in FIG. 15B, when a distortion type is ringing, the distortion compensation circuit 140 removes or compensates distortion only for each region R21 and R22, which corresponds to a data '1' (INF=1), i.e., where distortion may occur. For example, a region R21 of the second high resolution image HRI2 is clamped to one of a minimum value Min1 and a maximum value Max1 of the first high resolution image HRI1, e.g., a minimum value Min1, by the clamp circuit 140-2. In other words, a value of a processing pixel included in a region R21 of the second high resolution image HRI2 is clamped to a minimum value of a pixel of the first high resolution region, corresponding to the region R21.

In addition, a region R22 of the second high resolution image HRI2 is clamped to one of a minimum value Min2 and a maximum value Max2 of the first high resolution image HRI1, e.g., a maximum value Max2, by the clamp circuit 140-2. In other words, a value of a processing pixel included in the region R22 of the second high resolution image HRI2 is clamped to a maximum value of a pixel of a first high resolution region, corresponding to the region R22.

For example, when the information INF is a data '1' (INF=1), the distortion compensation circuit 140 clamps each second region R21 and R22 of the second high resolution image HRI2 and outputs a clamped region by referring to each third region of the first high resolution image HRI1, which corresponds to each second region R21 and R22 of the second high resolution image HRI2, and outputs a clamped region.

As described above, the distortion compensation circuit 140 outputs each region corresponding to a data '0' (INF=0), i.e., each region of the second high resolution image HRI2, as it is. However, the distortion compensation circuit 140 clamps each region corresponding to a data '1' (INF=1), i.e., each region of the second high resolution image HRI2, and outputs a clamped region. For example, according to information INF having a data '0', a selection circuit 140-3 may bypass each region of the second high resolution image HRI2 input to a first input port IN1.

However, according to information INF having a data '1', the selection circuit 140-3 may output an output signal of the clamp circuit 140-2 input to a second input port IN2.

The distortion compensation circuit 140 may compensate or clamp selectively each region included in the second high resolution image HRI2, based on information for each region included in a low resolution image LRI.

Figure 17:
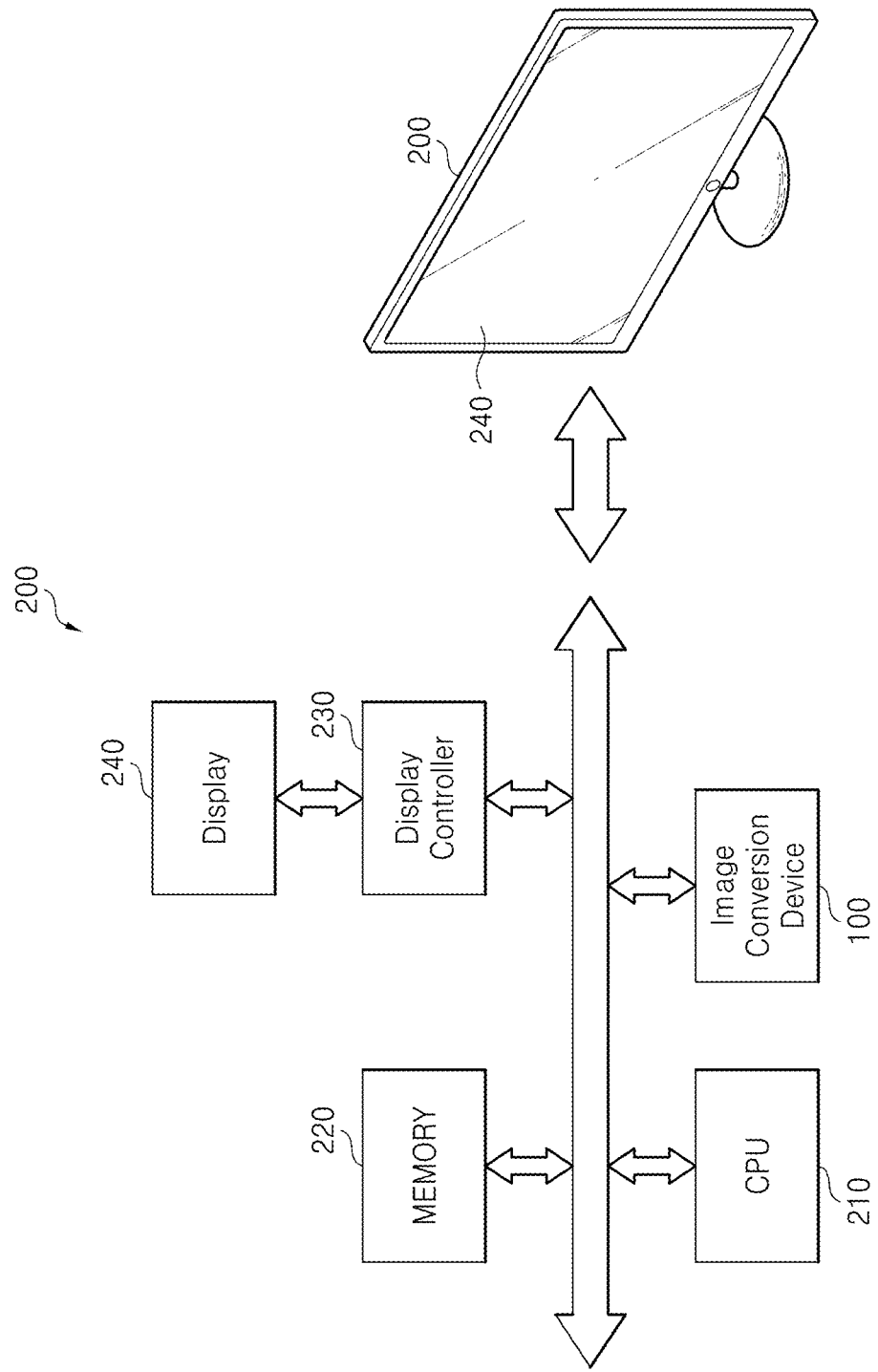
FIG. 17 is a block diagram depicting an example embodiment of an electronic device including the image resolution conversion device illustrated in FIG. 1.

FIG. 17 is a block diagram depicting an example embodiment of an electronic device including the image resolution conversion device illustrated in FIG. 1. Referring to FIGS. 1 and 17, an electronic device 200 includes an image resolution conversion device 100, a CPU 210, a memory 220, a display controller 230, and a display 240.

The electronic device 200 may be embodied in a television (TV), an internet protocol (IP) TV, a mobile IPTV, or a 3D TV. The CPU 210 controls an operation of each component 100, 220 and 230.

Under the control of the CPU 210, a low resolution image LRI stored in the memory 220 is transmitted to the image resolution conversion device 100. The image resolution conversion device 100 may generate information for at least a region where distortion may occur from the low resolution image LRI, and remove distortion of a detail-sharpness enhanced high resolution image by referring to a high resolution image which does not include distortion based on the information.

Under the control of the CPU 210, the display controller 230 may transmit a high resolution image HRIF output from the image resolution conversion device 100 to the display 240. Accordingly, the display 240 may display a high resolution image HRIF output from the image resolution conversion device 100, based on a control of the display controller 230.

The display 240 may be embodied in a thin film transistor-liquid crystal display (TFT-LCD), a light emitting diode (LED) display, an organic LED (OLED) display, an active-matrix OLED (AMOLED) display, or a flexible display.

Figure 18:
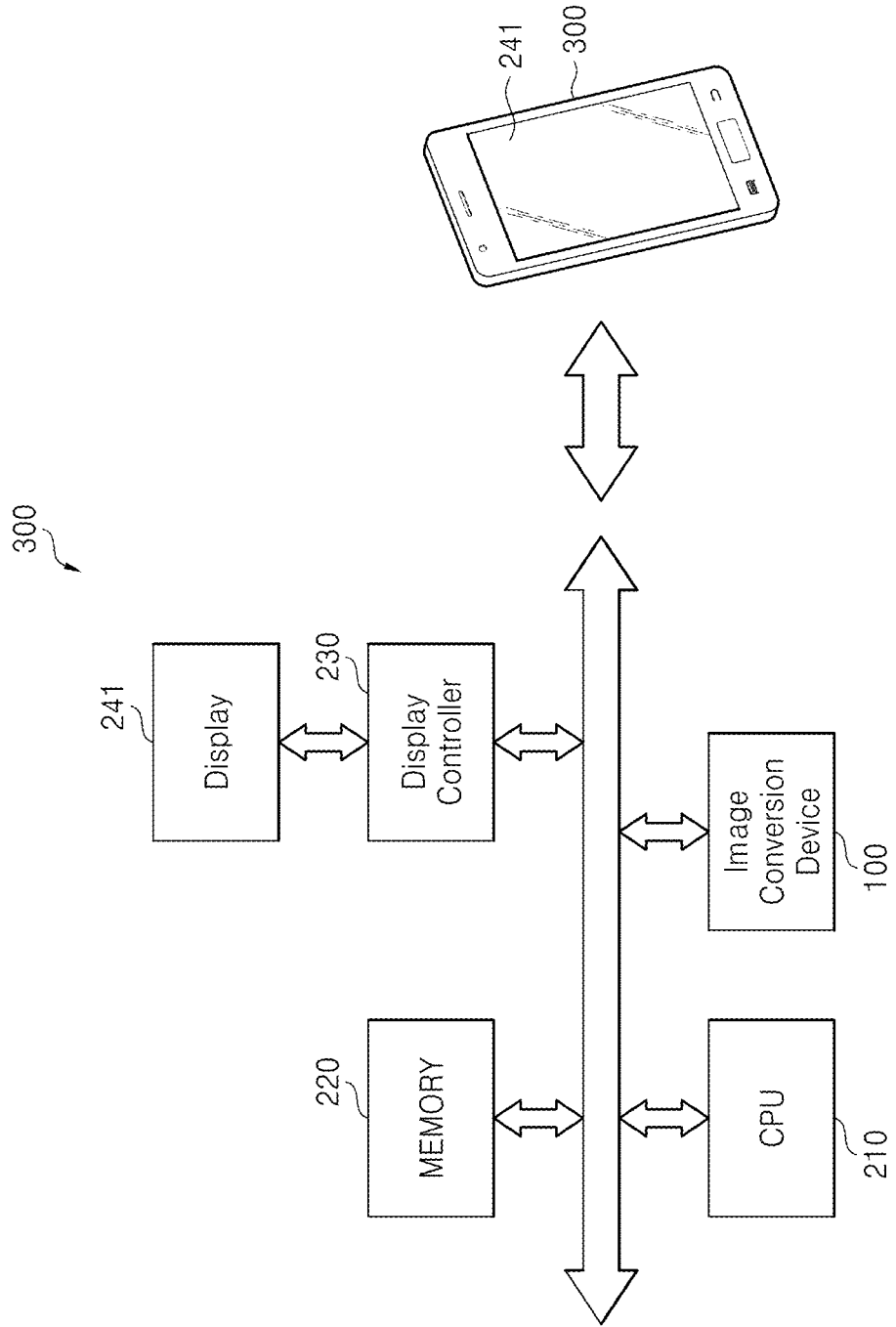
FIG. 18 is a block diagram depicting another example embodiment of the electronic device including the image resolution conversion device illustrated in FIG. 1.

FIG. 18 is a block diagram depicting another example embodiment of the electronic device including the image resolution conversion device illustrated in FIG. 1. Except for a size of the display 241, a structure of an electronic device 300 of FIG. 17 is substantially the same as a structure of the electronic device of FIG. 18.

The electronic device 300 may be embodied in a portable device. The portable device may be embodied in a laptop computer, a mobile phone, a smart phone, a tablet PC, a personal digital assistant (PDA), an enterprise digital assistant (EDA), a digital still camera, a digital video camera, a portable multimedia player (PMP), a personal navigation device or a portable navigation device (PND), a handheld game console, or an e-book.

FIG. 19 is a flowchart for explaining an operation of the image resolution conversion device illustrated in FIG. 1. Except for each line memory 101, 126 and 125, an operation and a function of each component 110, 116, 120, 130 and 140 included in the image resolution conversion device 100 illustrated in FIG. 1 may be embodied in software. A functional block embodied in the software is called a module. The software may be embodied in a recording medium, which is written in a computer-readable program code and may be read by a computer, e.g., a computer program product. However, embodiments are not limited. Components 110, 116, 120, 130, and 140 may be embodied in hardware and/or circuits. Further, components 110, 116, 120, 130, and 140 may include at least one processor for performing their respective functions.

The resolution conversion circuit 110 or resolution conversion module converts a low resolution image LRI into a high resolution image HRI (S110). A map generation circuit 116 or a map generation module generates information INF for a region where distortion may occur in a low resolution image LRI (S120).

The visual artifacts removal circuit 120 or visual artifacts removal module removes visual artifacts included in the high resolution image HRI to generate the first high resolution image HRI1 (S130). The image quality enhancement circuit 130 or image quality enhancement module enhances details and sharpness of the first high resolution image HRI1 to generate a second high resolution image HRI2 (S140).

The distortion compensation circuit 140 or distortion compensation module may compensate distortion included in the second high resolution image HRI2 by using information INF, and generates a distortion-compensated image HRIF (S150). The detail enhancement circuit 132 may be used in a display driver IC.

A method and a device for converting an image resolution according to an example embodiment of the present disclosure may enlarge a low resolution image into a high resolution image, generate information for a region where distortion may occur from the low resolution image, and remove ringing of a detail-sharpness enhanced high resolution image by referring to a high resolution image which does not include ringing based on the information.

Accordingly, the method and the device may not reduce sharpness of an edge.

The method and the device, to increase sharpness of an edge included in a high resolution image, do not use an iteration method for compensating a gradient value of the edge. The method and the device may minimize use of a line memory.

What is claimed is:

1. A method for converting an image resolution, comprising:
   converting a low resolution image into a high resolution image;
   generating a second high resolution image by compensating an image quality of the high resolution image; and
   selectively compensating a second region, which is included in the second high resolution image and corresponds to a first region included in the low resolution image, based on information about the first region,
   wherein the generating the second high resolution image includes:
      removing visual artifacts, included in the high resolution image, to generate a first high resolution image; and
      enhancing details and sharpness of the first high resolution image to generate the second high resolution image,
   wherein the enhancing the details and the sharpness includes:
      sampling a high frequency component of a texture portion, included in the first high resolution image;
      calculating an average gradient compensation value of an edge portion, included in the first high resolution image; and
      adjusting the details and the sharpness by using the sampled high frequency component and the average gradient compensation value, and
   wherein the sampling the high frequency component includes:
      low-pass filtering the first high resolution image;
      high-pass filtering the first high resolution image; and
      calculating a difference, between a low pass filtered first high resolution image and a high pass filtered first high resolution image, to sample the high frequency component.

2. A method for converting an image resolution, comprising:
   converting a low resolution image into a high resolution image;
   generating a second high resolution image by compensating an image quality of the high resolution image; and
   selectively compensating a second region, which is included in the second high resolution image and corresponds to a first region included in the low resolution image, based on information about the first region,
wherein the generating the second high resolution image includes:
   removing visual artifacts, included in the high resolution image, to generate a first high resolution image; and
   enhancing details and sharpness of the first high resolution image to generate the second high resolution image,
wherein the enhancing the details and the sharpness includes:
   sampling a high frequency component of a texture portion, included in the first high resolution image;
   calculating an average gradient compensation value of an edge portion, included in the first high resolution image; and
   adjusting the details and the sharpness by using the sampled high frequency component and the average gradient compensation value, and
wherein the adjusting the details and the sharpness adjusts the details and the sharpness by subtracting the sampled high frequency component and the average gradient compensation value from the first high resolution image.

\* \* \* \* \*